US010743693B2

(12) United States Patent
Newcomb

(10) Patent No.: US 10,743,693 B2
(45) Date of Patent: Aug. 18, 2020

(54) SECURE PACKAGE DELIVERY AND PICK-UP SYSTEM

(71) Applicant: Royce L Newcomb, Cameron Park, CA (US)

(72) Inventor: Royce L Newcomb, Cameron Park, CA (US)

(*) Notice: Subject to any disclaimer, the term of this patent is extended or adjusted under 35 U.S.C. 154(b) by 0 days.

(21) Appl. No.: 15/670,018

(22) Filed: Aug. 7, 2017

(65) Prior Publication Data

US 2020/0064814 A1     Feb. 27, 2020

Related U.S. Application Data

(60) Provisional application No. 62/371,976, filed on Aug. 8, 2016.

(51) Int. Cl.
*A47G 29/14* (2006.01)
*G07C 9/00* (2020.01)
(Continued)

(52) U.S. Cl.
CPC .......... *A47G 29/141* (2013.01); *A47G 29/14* (2013.01); *B65G 1/1373* (2013.01);
(Continued)

(58) Field of Classification Search
CPC .. G07C 9/00817; G07C 9/00; G07C 9/00896; G07C 9/00571; G07C 9/00912;
(Continued)

(56) References Cited

U.S. PATENT DOCUMENTS

| 476,139 A | * | 5/1892 | Faw | ................. A47G 29/12 232/19 |
| 1,579,520 A | * | 4/1926 | Fleming | ................. A47G 29/12 232/19 |

(Continued)

FOREIGN PATENT DOCUMENTS

| GB | 336850 A | * | 10/1930 | ............. A47G 29/28 |
| GB | 2366597 A | * | 3/2002 | ............. A47G 29/14 |

(Continued)

*Primary Examiner* — William L Miller
(74) *Attorney, Agent, or Firm* — Barry Choobin; Patent 360

(57) ABSTRACT

The embodiments herein provide a secure package delivery and pick-up system. The system comprises a security door with several collapsible storage compartments for accommodating packages meant for delivery or pick-up. The size of the compartments are configured to accommodate packages of different sizes and weights. The system enables secure delivery and return pick-up of packages at unmanned location by using security measures such as electronic key generation, biometric identification, RFID, video cameras. The user is facilitated to monitor the delivery and pick-up activity remotely through a mobile application downloaded on the computing device. The system is easy to install and provides protection of the packages form theft or damages due to weather conditions. The system enables user to share secure electronic keys with other users for a predetermined duration for accessing the building through the secure door and for usage of the storage compartments.

18 Claims, 8 Drawing Sheets

(51) Int. Cl.
| | |
|---|---|
| *E05B 47/00* | (2006.01) |
| *E05B 65/00* | (2006.01) |
| *E06B 7/32* | (2006.01) |
| *G05B 19/4155* | (2006.01) |
| *B65G 1/137* | (2006.01) |
| *G05B 15/02* | (2006.01) |
| *G06Q 10/08* | (2012.01) |
| *G06K 7/10* | (2006.01) |

(52) U.S. Cl.
CPC .......... *E05B 47/0001* (2013.01); *E05B 65/00* (2013.01); *E06B 7/32* (2013.01); *G05B 15/02* (2013.01); *G05B 19/4155* (2013.01); *G06Q 10/0833* (2013.01); *G06Q 10/0836* (2013.01); *G07C 9/00* (2013.01); *G07C 9/00817* (2013.01); *G07C 9/00896* (2013.01); *A47G 2029/145* (2013.01); *A47G 2029/149* (2013.01); *B65G 2201/0285* (2013.01); *B65G 2203/046* (2013.01); *E05B 2047/0088* (2013.01); *E05Y 2400/10* (2013.01); *E05Y 2400/85* (2013.01); *E05Y 2900/131* (2013.01); *G05B 2219/31043* (2013.01); *G06K 7/10297* (2013.01); *G07C 9/00571* (2013.01); *G07C 9/00912* (2013.01); *G07C 2009/0092* (2013.01); *G07C 2009/00825* (2013.01)

(58) Field of Classification Search
CPC .. G07C 2009/00825; G07C 2009/0092; A47G 29/14; A47G 29/141; A47G 29/20; A47G 29/16; A47G 2029/145; A47G 2029/147; A47G 2029/148; A47G 2029/149; B65G 1/1373; B65G 2201/0285; B65G 2203/046; E05B 47/0001; E05B 65/00; E05B 65/0075; E05B 7/32; E05B 2047/0088; G05B 15/02; G05B 19/4155; G05B 2219/31043; G06Q 10/10853; G06Q 10/0836; E05Y 2400/10; E05Y 2400/85; E05Y 2900/131; G06K 7/10297; B65D 21/086; B65D 21/068; B65D 7/24
USPC .......... 232/19, 38, 45, 43.4; 220/6, 8; 70/63; 340/569
See application file for complete search history.

(56) References Cited

U.S. PATENT DOCUMENTS

| | | | | |
|---|---|---|---|---|
| 1,626,157 | A * | 4/1927 | Rossman | A47G 29/14 232/43.4 |
| 1,992,640 | A * | 2/1935 | Steen | A47G 29/1209 232/17 |
| 2,669,385 | A * | 2/1954 | Curcio | A47G 29/20 232/42 |
| 2,781,964 | A * | 2/1957 | Ledgerwood | A47G 29/1209 232/17 |
| 6,426,699 | B1 * | 7/2002 | Porter | A47F 10/00 221/2 |
| 9,861,221 | B2 * | 1/2018 | Jiang | G06Q 10/0833 |
| 10,299,617 | B1 * | 5/2019 | Castellanos | A47G 29/141 |
| 2002/0156645 | A1 * | 10/2002 | Hansen | G07F 17/12 705/333 |
| 2003/0006275 | A1 * | 1/2003 | Gray | A47G 29/141 232/19 |
| 2004/0083371 | A1 * | 4/2004 | Algazi | G06F 21/32 713/186 |
| 2004/0254802 | A1 * | 12/2004 | Miller | G07F 17/12 705/337 |
| 2008/0211170 | A1 * | 9/2008 | Motamed | B65H 31/14 271/207 |
| 2011/0057774 | A1 * | 3/2011 | Van Rysselberghe | G07C 9/33 340/5.73 |
| 2013/0098980 | A1 * | 4/2013 | Supulski | A47G 29/1209 232/38 |
| 2016/0286998 | A1 * | 10/2016 | Lindbo | G07F 9/105 |
| 2016/0331171 | A1 * | 11/2016 | Jiang | G06Q 10/0833 |
| 2018/0228310 | A1 * | 8/2018 | Enobakhare | A47G 29/141 |
| 2019/0261802 | A1 * | 8/2019 | Vernal | A47G 29/14 |
| 2019/0344930 | A1 * | 11/2019 | Jessie | F25D 13/04 |
| 2019/0362577 | A1 * | 11/2019 | Vigil | G06K 7/1417 |
| 2020/0071991 | A1 * | 3/2020 | Patel | E06B 7/28 |

FOREIGN PATENT DOCUMENTS

| | | | |
|---|---|---|---|
| JP | 10276893 A | * | 10/1998 |
| JP | 11247548 A | * | 9/1999 |

* cited by examiner

500

SECURE PACKAGE DELIVERY AND PICK-UP SYSTEM

CROSS-REFERENCE TO RELATED APPLICATIONS

The embodiments herein are claims the priority of the United States Provisional patent application with the Ser. No. 62/371,976 filed on Aug. 8, 2016 and entitled, "eDOR", and the contents of which are included in entirety as reference herein.

BACKGROUND

Technical Field

The embodiments herein are generally related to the field of package delivery systems. The embodiments herein are particularly related to systems for secure delivery of packages at unattended locations. The embodiments herein are more particularly related to an electronic box or secured automated receptacles fitted with electronic door for the receipt, storage and return pick-up of packages.

Description of the Related Art

With the advent of electronic commerce in recent times, home delivery of products has become more and more popular. The delivery persons are assigned the job of delivering the packages to users. The service is completed, when the user accepts the delivery of the package. However, there are various circumstances that impact the ability of delivery firms in completing the delivery process, especially when an individual is not available to accept the package to be delivered. In some cases, the delivery firms are allowed to leave the package even though a user is not available to accept it. The packages are left unattended at the user's residential or business address. This always carries the risk of theft or damage of the package due to weather conditions.

Thus, the delivery persons are instructed for security reasons to delivery packages only when the user is available to receive the package. The delivery is confirmed by collecting a signature of the user to confirm an acceptance of the package. The delivery firms are instructed not to leave packages unless they are accepted by the users. The delivery firms need to make subsequent attempts to deliver the package, when the user is not available to receive the packages. Even after several subsequent attempts, the deliveries are unsuccessful in some cases. This results in delayed delivery of the package or the package is returned to the sender/seller because of unsuccessful attempts at delivery. This causes inconvenience to the users and additional costs for the seller/delivery firms due to repeated failed delivery attempts and returned merchandise.

Furthermore, in some cases, the users are provided with an option of picking up the product at a specified outlet. But, such locations are not always nearby to the user location and hence involve additional costs. Thus, this option does not offer a convenient alternative to the user. Similarly, for returning the pick-up, the users need to courier the packages themselves to the seller or have to leave it outdoors at a specified time/day and to ensure the availability of the packages at the time of visit of the delivery person for return pick-up. Thus, the packages are always at a risk of theft or damage. Additionally, some products such as grocery, food items and medicines get spoiled when they are left unattended for longer durations as hot or cold storage of such products is needed immediately on delivery.

Hence, there is a need for providing a secure and convenient option for delivery and pick-up of packages at unattended locations. There is also a need for a modular system for delivery and pick-up of packages of varying size and weight. Further, there is a need for an automated receptacle with electronic door for the receipt, storage and pickup of a package.

The above mentioned shortcomings, disadvantages and problems are addressed herein and which will be understood by reading and studying the following specification.

OBJECTS OF THE EMBODIMENTS

The primary object of the embodiments herein is to provide a secure and convenient option for delivery and pick-up of packages at unattended locations.

Another object of the embodiments herein is to provide a modular system for delivery and pick-up of packages of varying size and weight.

Yet another object of the embodiments herein is to provide an automated goods receptacle or safe with electronic door for the receipt, storage and pickup of a package.

Yet another object of the embodiments herein is to provide an automated package receptacle door that protects the packages form theft and damage due to weather.

Yet another object of the embodiments herein is to provide an automated package receptacle door that is easy to install on entry doors, walls, fence and the like.

Yet another object of the embodiments herein is to provide an automated package receptacle door that comprises one or more compartments for the delivery of plurality of products comprising food, groceries, medicines, personal items, dry cleaning items etc.

Yet another object of the embodiments herein is to provide a secure package delivery and pick-up system that offers an auto-notification feature for notifying the users regarding a pick-up or delivery of the packages.

Yet another object of the embodiments herein is to provide a secured door that facilitates automatic locking or unlocking of individual compartments after delivery or pickup.

Yet another object of the embodiments herein is to provide a secure package delivery and pick-up system that facilitates sharing of an electronic key for remote access to lock and unlock the plurality of compartments provided in the with door.

Yet another object of the embodiments herein is to provide a door with an automated package receptacle that comprises separate compartments with freezer box and hot box for the delivery of cold as well as hot products respectively.

Yet another object of the embodiments herein is to provide a door with an automated package receptacle that comes in wide variety of configurations and sizes based on user need and inputs.

Yet another object of the embodiments herein is to provide an automated package receptacle that is easy to install with any type of entry doors in residential or commercial buildings.

Yet another object of the embodiments herein is to provide a secure package delivery and pick-up system that offers enhanced security features such as RFID, passwords using keypad, biometric identification, iris scanning and the like, to the users.

Yet another object of the embodiments herein is to provide a secure package delivery and pick-up system that comprises an associated mobile application downloaded on the mobile device of the user for providing package delivery and pick-up related information.

Yet another object of the embodiments herein is to provide a mobile application to the user for administering package delivery and pick-up activity form a remote location, for registering other users such as family member, friends, service/delivery personnel with the system, for configuring varied degreed of access rights for individual user.

Yet another object of the embodiments herein is to provide an electronic door with an automated package receptacle that is operable by the family members or friends of the user after registration and by the service or delivery personal on sharing the electronic key.

Yet another object of the embodiments herein is to provide a secure package delivery and pick-up system that comprises an associated cloud storage system for storing plurality of details related to user, smartphone of the user, delivery person and package tracking.

Yet another object of the embodiments herein is to provide a secure package delivery and pick-up system provided with electronic key which is generated and used to open a specific compartment or any other available empty compartment.

Yet another object of the embodiments herein is to provide a secure package delivery and pick-up system in which the locking or unlocking of all the compartments is done by the authorized user remotely via smartphone or personal computer (PC).

Yet another object of the embodiments herein is to provide a secure package delivery and pick-up system that shares exact GPS coordinates of the secure electronic door (e-door) and electronic key with the delivery/pickup personal to avoid possibility of incorrect delivery.

Yet another object of the embodiments herein is to provide a door with an automated package receptacle that comprises a built in wireless power system for powering up the receptacle door in case of power failures.

Yet another object of the embodiments herein is to provide an electronic door that comprises an automated package receptacle and a built in IOT expandable platform to connect with external IOT devices such as camera, sensors, communication module etc.

Yet another object of the embodiments herein is to provide a door with an automated package receptacle and comprises built in exterior and interior high definition (HD) and night vision cameras for capturing the surrounding activity.

Yet another object of the embodiments herein is to provide a secure package delivery and pick-up system with an enhanced security features by recording the International Mobile Subscriber Identification (IMSI) number of any user which comes in close vicinity of the door.

Yet another object of the embodiment herein is to provide a secure package delivery and pick-up system that enables the user to upgrade the software of the control unit remotely to provide additional features and enhance security.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a secure package delivery and pick-up system. The system comprises a security door comprising a frame. The frame is configured for attaching to any firm surface of a building. The security door is configured for providing access to the building after successful verification of the user. The security door comprises one or more collapsible compartments affixed to the frame. Each collapsible compartment is configured for accommodating one or more packages meant for delivery or return pick-up. Each compartment comprises a series of four sided metal or wooden boxes with open ends designed to slide into one another in a telescopic manner to accommodate one or more packages. Both open ends of the compartment are secured using compartment doors for delivery and reception of the one or more packages respectively. The series of four sided metal or wooden boxes are configured for extending in a perpendicular direction to the length of the frame to achieve maximum storage size of the compartment and for contracting within each other to achieve a minimum size of the compartment. Each collapsible compartment comprises an external flange on the exterior side of the compartment and an internal flange on the interior side of the compartment for providing strength and support to the compartment in extended and collapsed state. The security door further comprises an electronic unit mounted on the frame. The electronic unit is configured for electronically controlling the operation of the one or more compartments for secure delivery or return pick-up of the one or more packages at unmanned locations.

According to an embodiment herein, the system further comprises a cloud based server comprising a registration module configured for registering one or more users with the system for operating the security door and the one or more compartments provided in the security door. The one or more users are registered with the system by providing a plurality of user details and the details of the one or more smartphones associated with each user. The one or more user details comprise name, address, contact numbers and biometric data. The server also comprises a storage unit configured for storing the plurality of user details, the details of the one or more smartphones associated with each user registered with the system and the GPS coordinates of the secured door. The server further comprises a tracking module configured for tracking the delivery and a pick-up activity of the one or more packages to an appropriate compartment. The server still further comprises an electronic key generation module configured for generating an electronic key for exchanging between the user and a delivery person for operating the compartment door. The server still further comprises a notification module configured for sending automatic notifications to the one or more users upon successful delivery or pick-up of the package.

According to an embodiment herein, the electronic unit comprises a control unit, a transceiver unit, a digital display, one or more cameras, a scanner unit, one or more sensors and a power unit.

According to an embodiment herein, the transceiver unit is configured for transmitting an electronic key entered by the user to verify with the server for operating the door or individual compartments. The transceiver unit is further configured for transmitting the information captured using one or more sensors.

According to an embodiment herein, the control unit is configured for controlling the opening and closing operations of appropriate compartment door on successful verification of secure electronic key.

According to an embodiment herein, the digital display is configured for displaying the video messages recorded by the user to the appropriate delivery person or vice-versa.

According to an embodiment herein, the one or more cameras are configured for recording activities in the vicinity of the security door on detecting any motion using motion sensors during any time of the day for security purpose.

According to an embodiment herein, the scanner unit is configured for scanning RFID tags of the parcel and the biometric data of the one or more users registered with each door for security purpose.

According to an embodiment herein, the one or more sensors are configured for detecting a plurality of parameters surrounding the door, and wherein the plurality of parameters comprises a motion detection in the vicinity of the door, IMEI number of the smartphone present in close vicinity of the door, smoke and fire.

According to an embodiment herein, the power unit is configured for supplying sufficient power required for operation of the door using one or more rechargeable batteries.

According to an embodiment herein, the system offers keyless entry through the door upon successful verification of the electronic key.

According to an embodiment herein, the system further comprises one or more multi-stage actuators and support guides for expansion and contraction of the one or more compartments. A power source used for the expansion and contraction of each compartment is either manual or electric.

According to an embodiment herein, the one or more compartments provided in the security door are customizable in capacity for accommodating one or more packages of different sizes and weights.

According to an embodiment herein, the system comprises a portal or platform for connecting one or more external Internet of Things (IOT) devices with the system, and wherein the one or more external IOT devices comprises camera, one or more sensors, communication modules.

According to an embodiment herein, the one or more compartments optionally comprise hot and cold boxes for storing hot or refrigerated products respectively.

According to an embodiment herein, the system is further configured for providing a mobile application for installing on the smartphone of the user, and wherein the mobile application is configured for enabling the user to remotely track the package delivery or pick-up activity, for viewing captured information from one or more IOT devices, for administration activity like adding/removing user and for exchanging secured electronic keys with the control unit.

According to an embodiment herein, the system is further configured for enabling the user to share the secured electronic keys with other users for a predetermined duration for accessing the building through the security door and for usage of the one or more compartments.

According to an embodiment herein, the mobile application provided to the user is configured for allowing the user to lock or unlock the security door or the individual compartments wirelessly from a remote location.

According to an embodiment herein, the system is further configured for enabling the user to remotely upgrade the software of the control unit to provide additional features and enhance security options.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

BRIEF DESCRIPTION OF THE DRAWINGS

The other objects, features and advantages will occur to those skilled in the art from the following description of the preferred embodiment and the accompanying drawings in which.

Figure 1A:
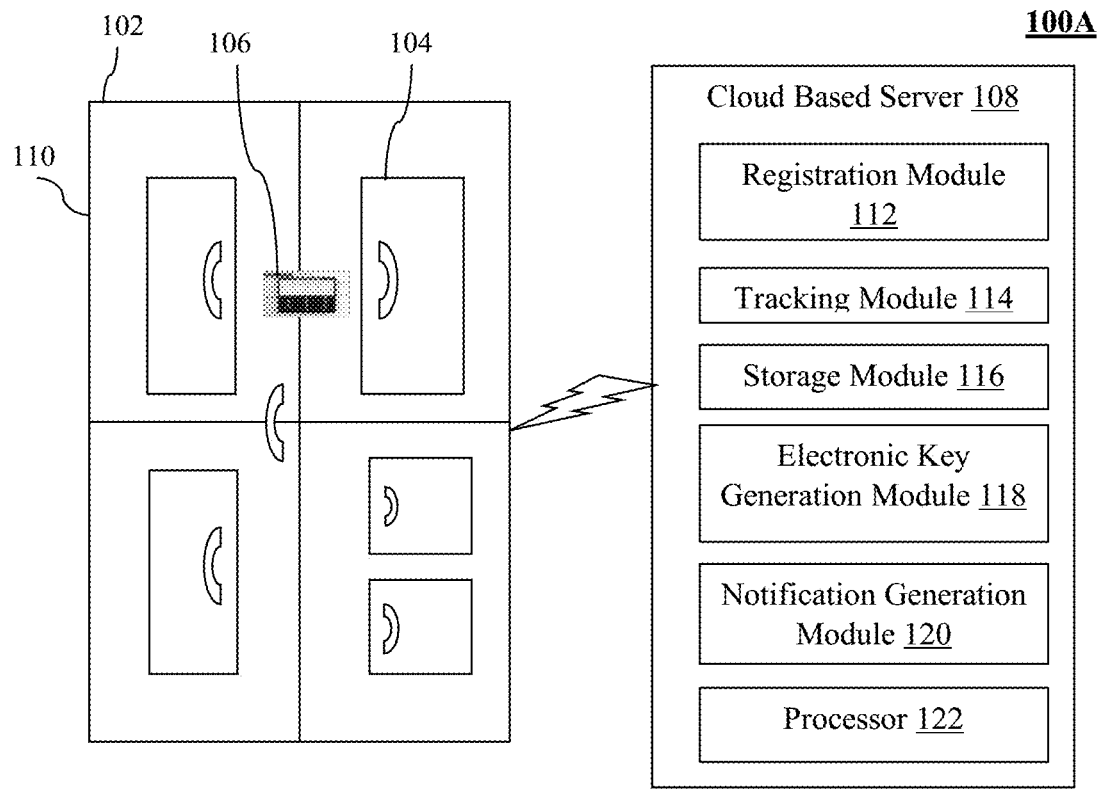
FIG. 1A illustrates a block diagram of the secured package delivery and pick-up system, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a secure package delivery and pick-up system. The system comprises a security door comprising a frame. The frame is configured for attaching to any firm surface of a building. The security door is configured for providing access to the building after successful verification of the user. The security door comprises one or more collapsible compartments affixed to the frame. Each collapsible compartment is configured for accommodating one or more packages meant for delivery or return pick-up. Each compartment comprises a series of four sided metal or wooden boxes with open ends designed to slide into one another in a telescopic manner to accommodate one or more packages. Both open ends of the compartment are secured using compartment doors for delivery and reception of the one or more packages respectively. The series of four sided metal or wooden boxes are configured for extending in a perpendicular direction to the length of the frame to achieve maximum storage size of the compartment and for contracting within each other to achieve a minimum size of the compartment. Each collapsible compartment comprises an external flange on the exterior side of the compartment and an internal flange on the interior side of the compartment for providing strength and support to the compartment in extended and collapsed state. The security door further comprises an electronic unit mounted on the frame. The electronic unit is configured for electronically controlling the operation of the one or more compartments for secure delivery or return pick-up of the one or more packages at unmanned locations.

According to an embodiment herein, the system further comprises a cloud based server comprising a registration module configured for registering one or more users with the system for operating the security door and the one or more compartments provided in the security door. The one or more users are registered with the system by providing a plurality of user details and the details of the one or more smartphones associated with each user. The one or more user details comprise name, address, contact numbers and biometric data. The server also comprises a storage unit configured for storing the plurality of user details, the details of the one or more smartphones associated with each user registered with the system and the GPS coordinates of the secured door. The server further comprises a tracking module configured for tracking the delivery and a pick-up activity of the one or more packages to an appropriate compartment. The server still further comprises an electronic key generation module configured for generating an electronic key for exchanging between the user and a delivery person for operating the compartment door. The server still further comprises a notification module configured for sending automatic notifications to the one or more users upon successful delivery or pick-up of the package.

According to an embodiment herein, the electronic unit comprises a control unit, a transceiver unit, a digital display, one or more cameras, a scanner unit, one or more sensors and a power unit.

According to an embodiment herein, the transceiver unit is configured for transmitting an electronic key entered by the user to verify with the server for operating the door or individual compartments. The transceiver unit is further configured for transmitting the information captured using one or more sensors.

According to an embodiment herein, the control unit is configured for controlling the opening and closing operations of appropriate compartment door on successful verification of secure electronic key.

According to an embodiment herein, the digital display is configured for displaying the video messages recorded by the user to the appropriate delivery person or vice-versa.

According to an embodiment herein, the one or more cameras are configured for recording activities in the vicinity of the security door on detecting any motion using motion sensors during any time of the day for security purpose.

According to an embodiment herein, the scanner unit is configured for scanning RFID tags of the parcel and the biometric data of the one or more users registered with each door for security purpose.

According to an embodiment herein, the one or more sensors are configured for detecting a plurality of parameters surrounding the door, and wherein the plurality of parameters comprises a motion detection in the vicinity of the door, IMEI number of the smartphone present in close vicinity of the door, smoke and fire.

According to an embodiment herein, the power unit is configured for supplying sufficient power required for operation of the door using one or more rechargeable batteries.

According to an embodiment herein, the system offers keyless entry through the door upon successful verification of the electronic key.

According to an embodiment herein, the system further comprises one or more multi-stage actuators and support guides for expansion and contraction of the one or more compartments. A power source used for the expansion and contraction of each compartment is either manual or electric.

According to an embodiment herein, the one or more compartments provided in the security door are customizable in capacity for accommodating one or more packages of different sizes and weights.

According to an embodiment herein, the system comprises a portal or platform for connecting one or more external Internet of Things (IOT) devices with the system, and wherein the one or more external IOT devices comprises camera, one or more sensors, communication modules.

According to an embodiment herein, the one or more compartments optionally comprise hot and cold boxes for storing hot or refrigerated products respectively.

According to an embodiment herein, the system is further configured for providing a mobile application for installing on the smartphone of the user, and wherein the mobile application is configured for enabling the user to remotely track the package delivery or pick-up activity, for viewing captured information from one or more IOT devices, for administration activity like adding/removing user and for exchanging secured electronic keys with the control unit.

According to an embodiment herein, the system is further configured for enabling the user to share the secured electronic keys with other users for a predetermined duration for accessing the building through the security door and for usage of the one or more compartments.

According to an embodiment herein, the mobile application provided to the user is configured for allowing the user to lock or unlock the security door or the individual compartments wirelessly from a remote location.

According to an embodiment herein, the system is further configured for enabling the user to remotely upgrade the software of the control unit to provide additional features and enhance security options.

FIG. 1A illustrates a block diagram of the secure package delivery and pick-up system, according to one embodiment herein. With respect to FIG. 1A, the system comprises the secure door 102, the one or more storage compartments 104, the electronic unit 106 and the cloud based server 108. The secure door 102 comprises a frame 110 configured for attaching to any firm surface of a building. The secure door 102 is configured for providing access to the building after successful verification of the user.

According to an embodiment herein, the system offers keyless entry through the secure door 102 upon successful verification of the electronic key. The one or more collapsible storage compartments 104 are affixed to the frame 110 of the secure door 102. Each collapsible compartment 104 is configured for accommodating one or more packages (not shown) meant for delivery or return pick-up. The one or more storage compartments 104 are customizable in size and capacity based on user requirement.

According to one embodiment, each storage compartment door (interior and exterior) comprises a handle for the user or delivery person to hold and operate the door. The one or more compartments are designed in a manner to accommodate a wide variety of items being placed inside for secure storage until such time that the receiver (either ingoing or outgoing) retrieve's the item/package. The wide variety of items include, but are not limited to, a package, groceries, food, hot or cold products, dry cleaning or even single items such as a set of keys, an envelope, or prescription medications and the like.

According to an embodiment herein, the cloud based server comprises the registration module 112, the tracking module 114, the storage module 116, the electronic key generation module 118, the notification generation module 120, and the processor 122. The registration module 112 is configured for registering one or more users with the system for operating the secure door 102. The one or more users are registered with the system using plurality of user details and the details of the one or more smartphones associated with each user. The one or more user details comprise name, address, contact numbers and biometric data and the like. The tracking module 114 is configured for tracking the delivery and pick-up activity of the one or more packages to appropriate storage compartment 104. The storage module 116 is configured for storing the plurality of user details, the details of the one or more smartphones associated with each user registered with the system and the GPS coordinates of the secure door 102. The electronic key generation module 118 is configured for generation of an electronic key for exchanging between the user and the delivery person for operating the compartment door. The notification generation module 120 is configured for sending automatic notifications to the one or more users upon successful delivery or pick-up of the package. The processor 122 is configured for processing requests received from other modules and interacts with the storage module 116.

According to an embodiment herein, the electronic unit 106 is mounted on the the frame 110. The electronic unit is configured for electronically controlling the operation of the one or more compartments 104 for secure delivery or return pick-up of the one or more packages at unmanned locations. The electronic unit 106 is mounted at any convenient place on the secure door as per user requirement.

Figure 1B:
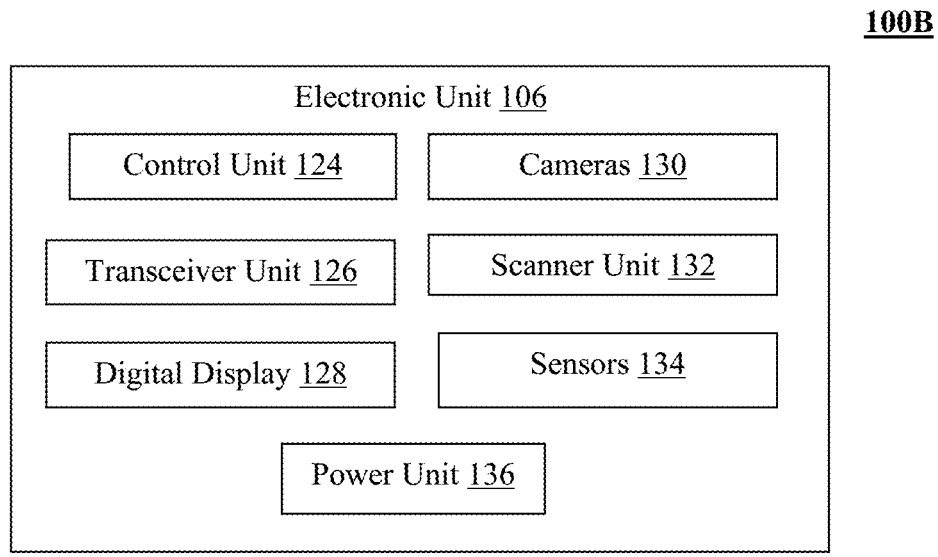
FIG. 1B illustrates the block diagram of the electronic unit provided in the secure door, according to one embodiment herein.

FIG. 1B illustrates the block diagram of the electronic unit provided in the secure door, according to one embodiment herein. With respect to FIG. 1B, the electronic unit 106 comprises a control unit 124, a transceiver unit 126, a digital display 128, one or more cameras 130, a scanner unit 132, one or more sensors 134 and a power unit 136. The transceiver unit 126 is configured for transmitting an electronic key entered by the user to verify with the server for operating the secure door 102 or individual compartments 104. The transceiver unit 126 is further configured for transmitting the information captured using one or more sensors 134. The control unit 124 is configured for controlling the opening and closing operations of appropriate compartment door on successful verification of secure electronic key. The digital display 128 is configured for displaying the video messages recorded by the user to the appropriate delivery person or vice-versa. The one or more cameras 130 (e.g. HD and night vision cameras) are configured for recording activities in the vicinity of the secure door 102 on detecting any motion using motion sensors any time of the day for security purpose. This is done for detecting any suspicious individual or activity in the vicinity of the secure door. The activity is captured while such individuals are clueless that they are being tracked. The scanner unit 132 is configured for scanning RFID tags of the parcel/packages and the biometric data of the one or more users registered with each secure door for security purpose. The one or more sensors 134 are configured for sensing plurality of parameters surrounding the secure door 120. The plurality of parameters comprise motion detection in the vicinity of the secure door, IMEI number of the smartphone present in close vicinity of the secure door, smoke and fire. The power unit 136 is configured for supplying sufficient power required for operation of the secure door 102 using one or more rechargeable batteries. In one example embodiment, lithium ion battery inductive power supply is used.

Figure 2:
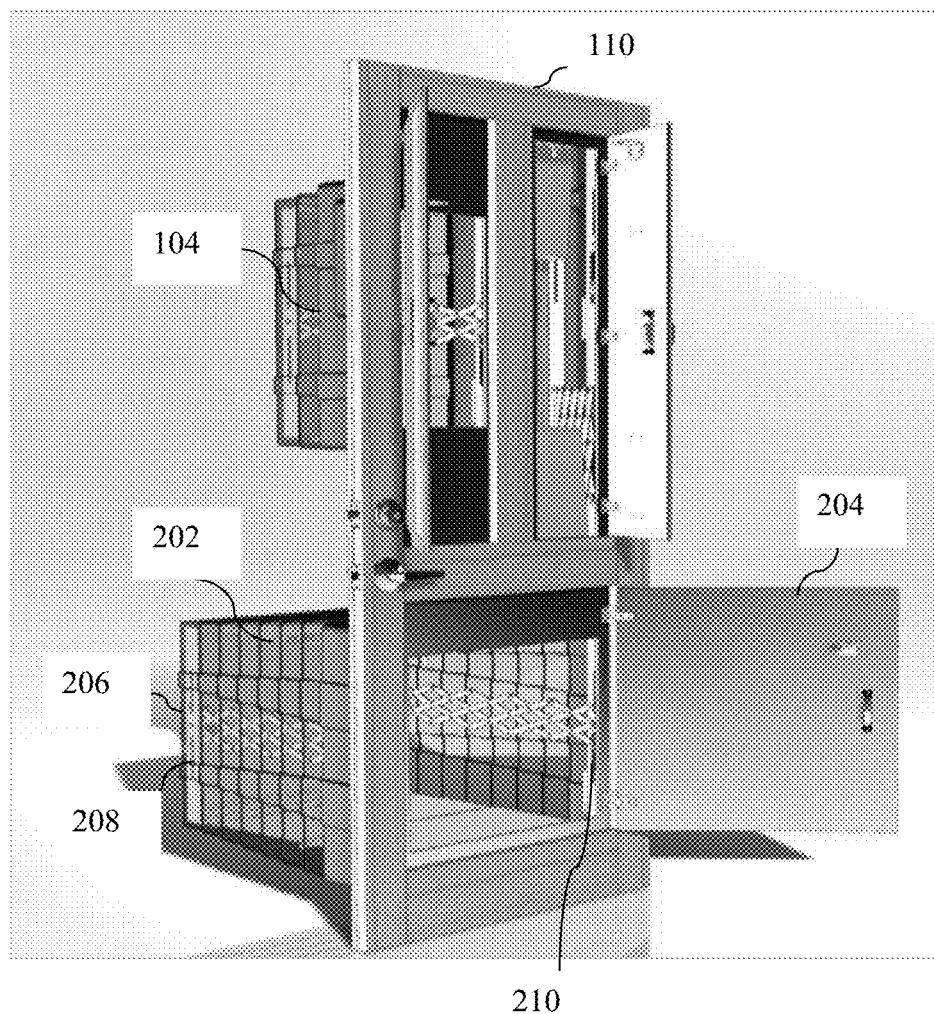
FIG. 2 illustrates a side perspective view of the security door fixed with a plurality of storage compartments/receptacles, according to one embodiment herein.

FIG. 2 illustrates a side perspective view of the security door fixed with a plurality of storage compartments/receptacles, according to one embodiment herein. With respect to FIG. 2, each compartment 104 comprises a series of four sided metal boxes 202 with open ends designed to slide into one another in a telescopic manner to accommodate one or more packages. Both open ends of the compartment 104 are secured using compartment doors 204, 206 for delivery and reception of the one or more packages respectively. The series of four sided metal boxes 202 are configured for extending in perpendicular direction to the length of the frame 110 to achieve maximum storage size of the compartment and for contracting within each other to achieve minimum size of the compartment.

According to one embodiment herein, the one or more storage compartments 104 optionally comprise hot and cold boxes for safe keeping of hot or refrigerated products respectively. Each collapsible storage compartment 104 comprises an external flange 208 (90 degrees) on the exterior side of the compartment and an internal flange 210 (90 degrees) on the interior side of the compartment for providing strength and support to the compartment in extended and collapsed state. The external and internal flanges are also attached in a perpendicular direction of the length of frame 110.

According to an embodiment herein, the secure door is easy to be installed in walls, fences, or various other substrate materials and structures. The installation process is done either by the user, handyman or any locally trained person. The secure door is manufactured from industry standard materials in the exterior door segment that comprise all types of steel, fiberglass, wood, Masonite and even glass door systems. The material used for the manufacturing of one or more compartments comprise, but are not limited to, steel, metal, aluminum, plastic, carbon fiber, and any suitable substrate material that properly supports the weight and bulk of a placed item.

According to an embodiment herein, the individual compartments are installed in any type of exterior or interior wall systems, window cavities, or gate systems of buildings and do not need to be incorporated into a door. Furthermore, electronic unit in combination with such compartment provides the operational and communication system(s) that allows for the expansion and contraction of the compartment. The user is notified about successful deliveries made, as well as two-way communication between the user and the delivery person/firm is established.

Figure 3:
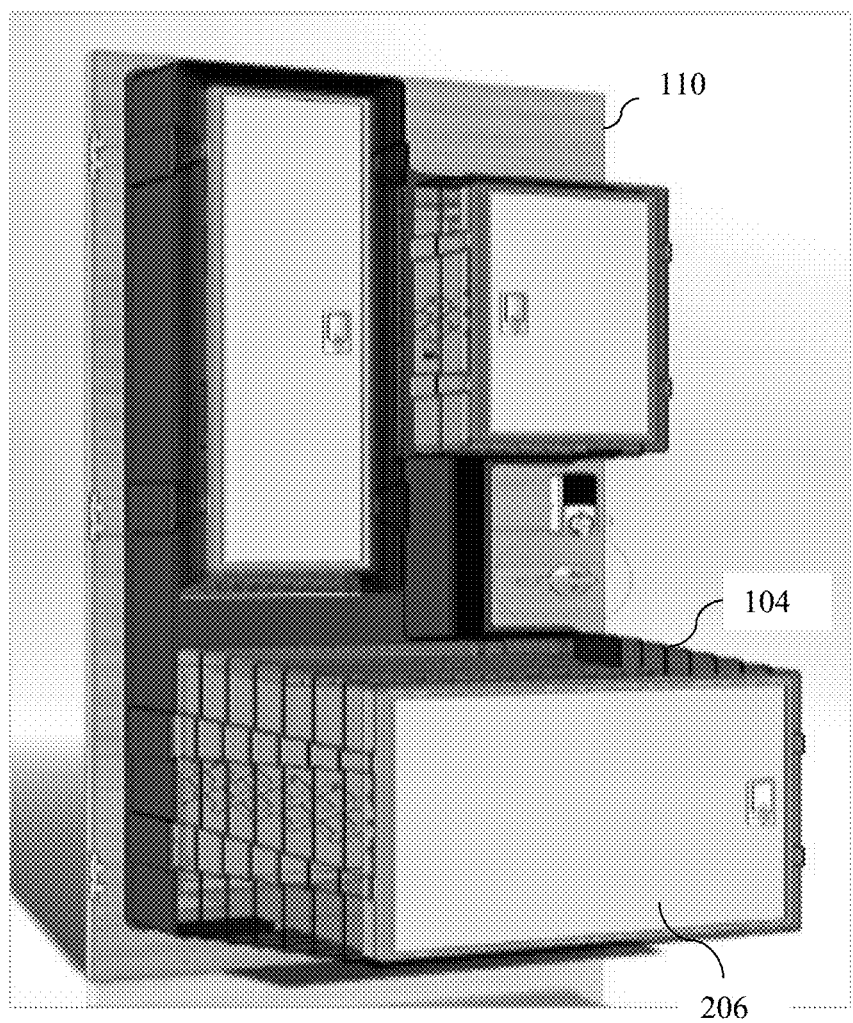
FIG. 3 illustrates a back side perspective view of the security door with the one or more storage compartments/receptacles in an expanded condition, according to one embodiment herein.

FIG. 3 illustrates a back side perspective view of the security door with the one or more storage compartments/receptacles in an expanded condition, according to one embodiment herein. With respect to FIG. 3, the interior doors 206 of all storage compartments 104 are shown. The user operates the interior doors 206 individually for reception or return of the packages. The interior doors 206 are also operated by the user using secure electronic keys.

Figure 4A:
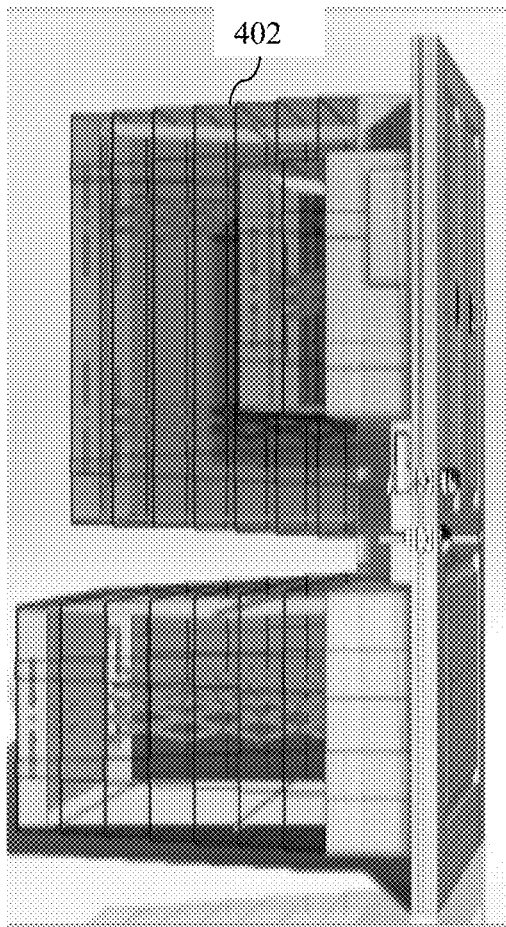
FIG. 4A and FIG. 4B illustrate a side view of the security door with the one or more storage compartments/receptacles in expanded and collapsed conditions respectively, according to one embodiment herein.
Figure 4B:
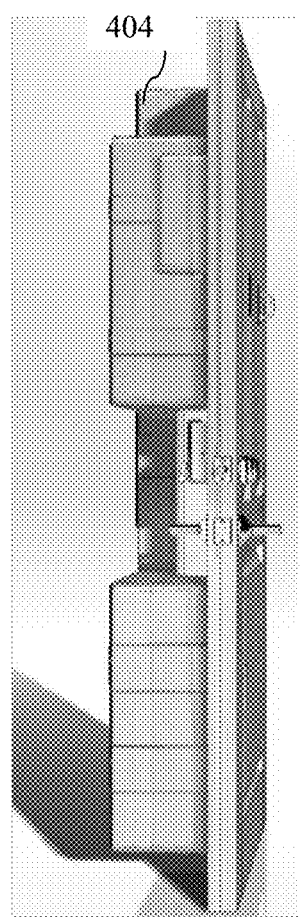

FIG. 4A and FIG. 4B illustrate a side view of the security door with the one or more storage compartments/receptacles in expanded and collapsed conditions respectively, according to one embodiment herein. With respect to FIG. 4, the one or more storage compartments 104 are shown in expanded (402) and contracted conditions (404) respectively. The system comprises one or more multi-stage actuators (not shown) and support guides (not shown) for expansion and contraction of the one or more compartments.

According to one embodiment herein, scissor hinges and supporting rods are used for accomplishing expansion and contraction operation in combination with linear actuators. The scissor hinges and supporting rods provide linear support during the course of movement and static positions. An interior hinged base provides support for the placement of an item/package once the complete expansion is accomplished. A power source used for the expansion and contraction of each compartment is either manual or electric.

According to one embodiment herein, sidewalls and/or bellows are utilized as exterior covering of the interior components that operate the expansion and contraction of each compartment.

According to one embodiment herein, manual operation of the one or more storage compartments is accomplished through a separate design which includes springs and hinges and does not require an electric motor or linear actuators.

Figure 5:
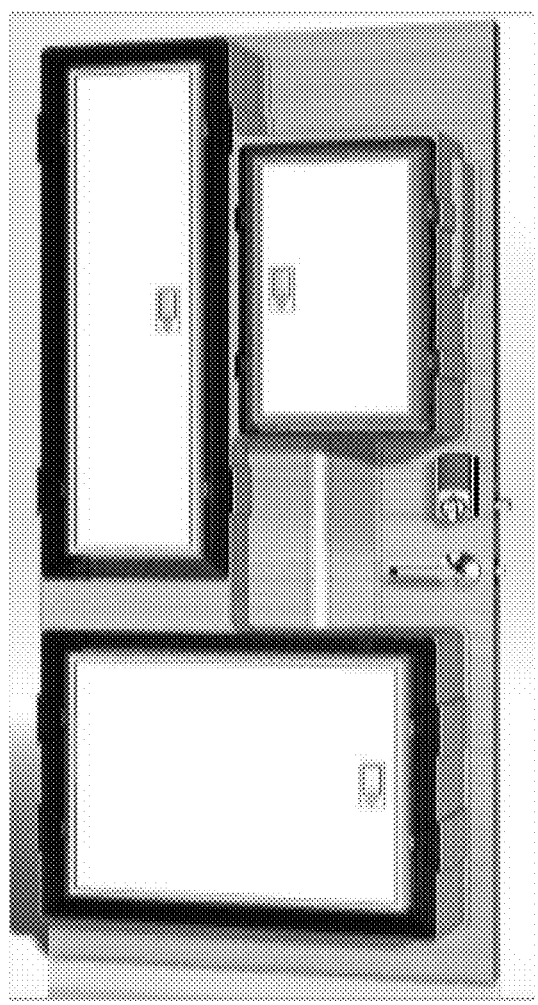
FIG. 5 illustrates a back side view of the security door with the one or more storage compartments/receptacles in collapsed condition, according to one embodiment herein.

FIG. 5 illustrates a back side view of the security door with the one or more storage compartments/receptacles in collapsed condition, according to one embodiment herein. With respect to FIG. 5, the back side view of the secure door 102 with all the compartments in contracted condition is shown.

Figures 6A, 6B:
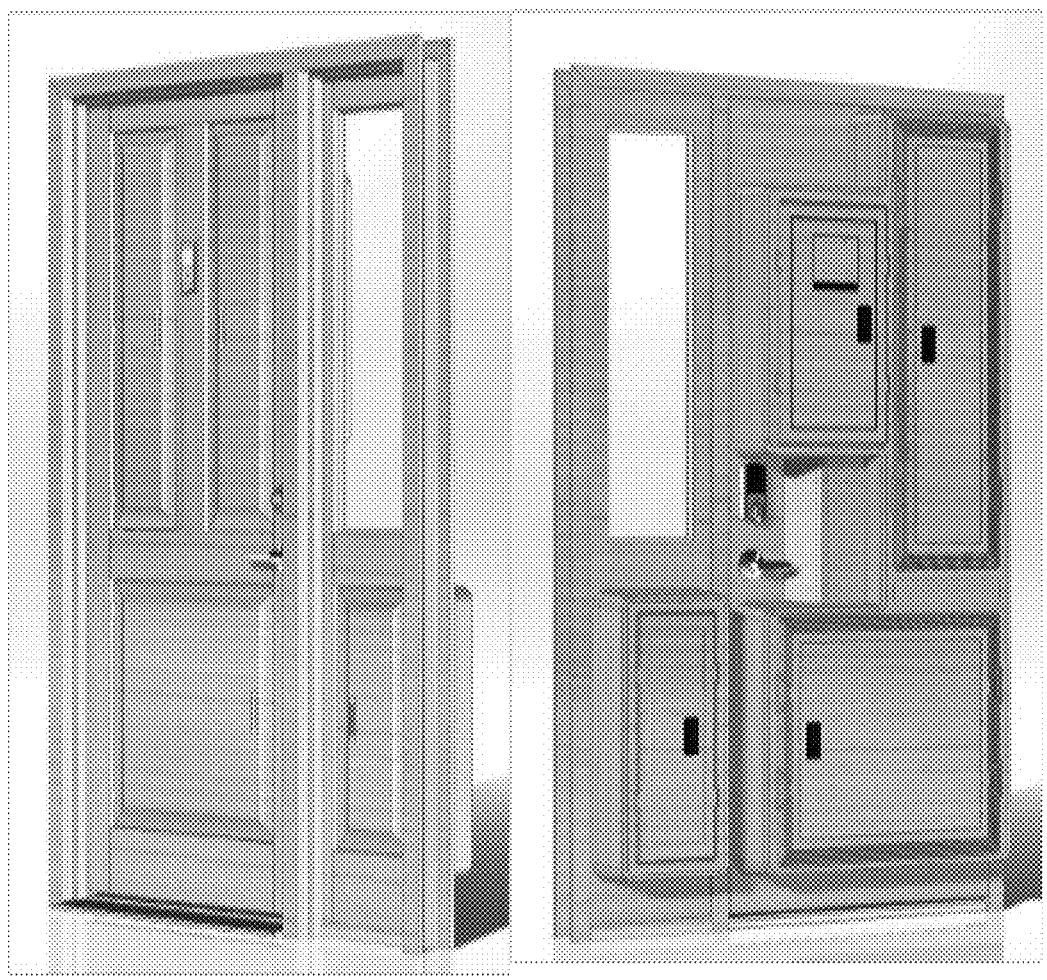
FIG. 6A and FIG. 6B illustrate a front side view and a back side view of the security door fixed with a plurality of storage compartments/receptacles, according to one embodiment herein.

FIG. 6A and FIG. 6B illustrate a front side view and a back side view of the security door fixed with a plurality of storage compartments/receptacles, according to one embodiment herein. With respect to FIG. 6A and FIG. 6B, the security door comprises four collapsible storage compartments of varying sizes.

Figures 7A, 7B:
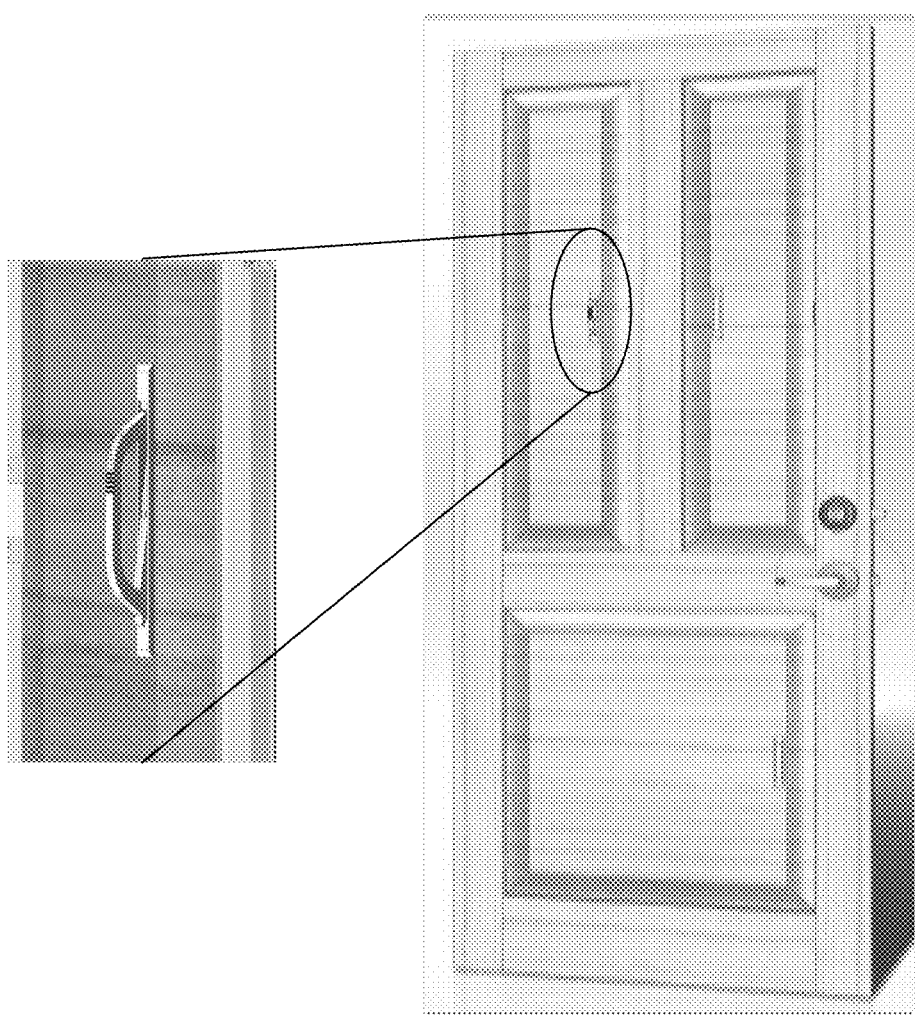
FIG. 7A and FIG. 7B illustrate a front side view of the security door with a handle comprising biometric sensor and an enlarged and magnified view of the handle with biometric sensor respectively, according to one embodiment herein.

FIG. 7A and FIG. 7B illustrate a front side view of the security door with a handle comprising biometric sensor and an enlarged and magnified view of the handle with biometric sensor respectively, according to one embodiment herein. With respect to FIG. 7A and FIG. 7B, the handles provided for operating one or more compartments in the secure door comprise biometric sensors to capture biometric data of the delivery person operating the door.

Figure 8:
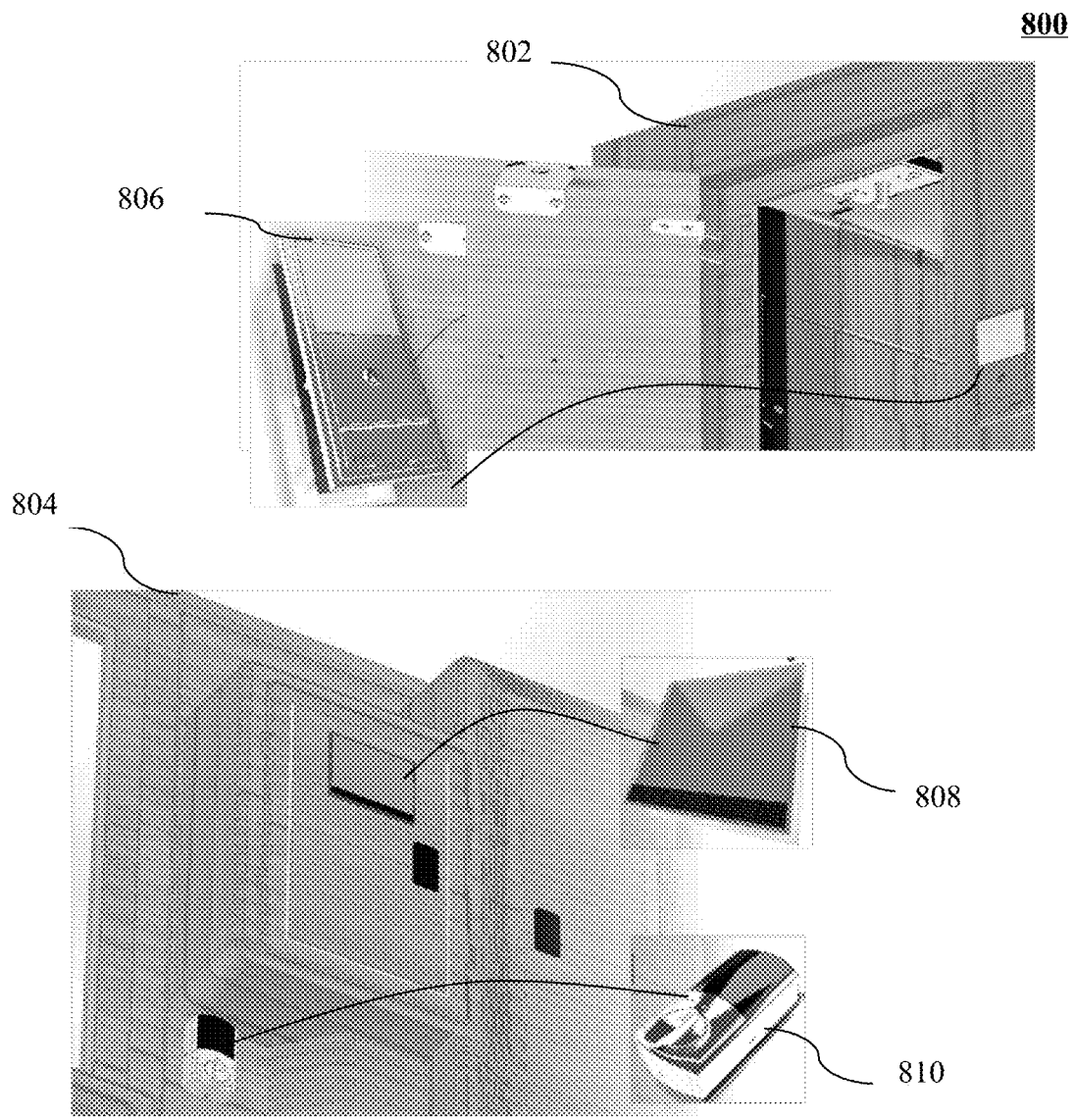
FIG. 8 illustrates a back side view of the security door fixed with an electronic unit and locking system, according to one embodiment herein.

FIG. 8 illustrates a back side view of the security door fixed with an electronic unit and locking system, according to one embodiment herein. With respect to FIG. 8, the audiovisual unit 806, the display unit 808 and the locking mechanism 810 are shown.

According to an embodiment herein, the system comprises an Internet of Things (JOT) expandable platform for connecting one or more external IOT devices with the system, for providing programmable and manual emergency contact with on-site and remote access, notifications and various other control options. The one or more external IOT devices comprises wireless exterior and interior cameras, one or more sensors (such as door and window sensors, smoke and fire sensors), communication modules and the like.

According to an embodiment herein, the system is further configured for providing a mobile application for installing on the smartphone of the user. The mobile application is configured for enabling the user to remotely track the package delivery or pick-up activity, for viewing captured information from one or more IOT devices, for administration activity like adding/removing user and for exchanging secure electronic keys with the control unit. The mobile application provided to the user is configured for allowing the user to lock or unlock the secure door or the individual compartments wirelessly from a remote location. The system is further configured for enabling the user to remotely upgrade the software of the control unit to provide additional features and enhance security options. The system is further configured for enabling the user to share secure electronic keys with other users for a predetermined duration for accessing the building through the secure door and for usage of the one or more compartments. All users who are given access of the secure door have their smartphone identification IMEI number registered and archived via the server storage and all the activities are tracked and retrieved.

According to an embodiment herein, exact GPS coordinates of the secure door are registered with the system. This information is shared with the delivery person with every electronic key to ensure timely delivery with no possibility of incorrect or un-traceable address or location.

Therefore, the secure package delivery and pick-up system makes receiving and sending of packages easy and simple using a modular platform. The system includes two-way HD and night vision camera's and communication system; keyless entry system; wireless power system, IOT expandable platform etc. The system offers a wide choice of integrated electronic secure door configurations, sizes and options to accommodate packages of any size and weight.

The system is easy to install and provides utmost protection of the packages form theft or damages due to weather conditions. The system is highly secure as several security measures (such as RFID, biometric data, electronic key exchange, mobile IMEI identification etc.) are considered for the delivery and pick-up of packages.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be the to fall there between.

What is claimed is:

1. A secure package delivery and pick-up system, the system comprising:
   a security door comprising a frame, and wherein the frame is configured for attaching to any firm surface of a building, and wherein the security door is configured for providing an access to the building after a successful verification of the user;
   one or more collapsible storage compartments affixed to the frame of the security door, and wherein each collapsible storage compartment is configured for accommodating one or more packages meant for delivery or return pick-up, and wherein each storage compartment comprises a series of four sided metal boxes with open ends designed to slide into one another in a telescopic manner to accommodate one or more packages, and wherein both open ends of the compartment are secured using compartment doors for delivery and reception of the one or more packages respectively, and wherein the series of four sided metal boxes are configured for extending in a perpendicular direction to the length of the frame to achieve maximum storage size of the storage compartment and for contracting within each other to achieve a minimum size of the storage compartment, and wherein each collapsible storage compartment comprises an external flange on the exterior side of the storage compartment and an internal flange on the interior side of the storage compartment for providing strength and support to the storage compartment in extended condition and contracted condition; and
   an electronic unit mounted on the frame, and wherein the electronic unit is configured for electronically controlling an operation of the one or more storage compartments for secure delivery or return pick-up of the one or more packages at unmanned locations.

2. The system according to claim 1, wherein the system further comprises a cloud-based server comprising:
   a registration module configured for registering one or more users with the system for operating the security door and the one or more storage compartments provided in the security door, and wherein the one or more users are registered with the system using plurality of user details and the details of one or more smartphones associated with each user, and wherein the one or more user details comprise name, address, contact numbers and biometric data;
   a storage unit configured for storing the plurality of user details, the details of the one or more smartphones associated with each user registered with the system and the GPS coordinates of the secure door;
   a tracking module configured for tracking the delivery and pick-up activity of the one or more packages to an appropriate storage compartment;
   an electronic key generation module configured for generating an electronic key for exchanging between the user and the delivery person for operating the compartment door; and
   a notification module configured for sending automatic notifications to the one or more users upon successful delivery or pick-up of the package.

3. The system according to claim 1, wherein the electronic unit comprises a control unit, a transceiver unit, a digital display, one or more cameras, a scanner unit, one or more sensors and a power unit.

4. The system according to claim 3, wherein the transceiver unit is configured for transmitting an electronic key entered by the user to verify with the server for operating the security door or individual compartments, and wherein the transceiver unit is further configured for transmitting the information captured using one or more sensors.

5. The system according to claim 4, further comprises a keyless entry through the security door after successful verification of the electronic key.

6. The system according to claim 3, wherein the control unit is configured for controlling an opening and closing operations of an appropriate storage compartment door after a successful verification of a secure electronic key.

7. The system according to claim 3, wherein the digital display is configured for displaying video messages recorded by the user to a delivery person or vice-versa.

8. The system according to claim 3, wherein the one or more cameras are configured for recording activities in the vicinity of the security door after detecting any motion using motion sensors during any time of the day for security purposes.

9. The system according to claim 3, wherein the scanner unit is configured for scanning RFID tags of the parcel and the biometric data of the one or more users registered with each secure door for security purposes.

10. The system according to claim 3, wherein the one or more sensors are configured for sensing a plurality of parameters surrounding the security door, and wherein the plurality of parameters comprise motion detection in the vicinity of the security door, IMEI number of a smartphone present in a close vicinity of the security door, smoke, and fire.

11. The system according to claim 3, wherein the power unit is configured for supplying an electrical power required for operation of the security door using one or more rechargeable batteries.

12. The system according to claim 1, further comprises one or more multi-stage actuators and support guides for extension and contraction of the one or more storage compartments, and wherein a power source used for the extension and contraction of each storage compartment is extended and contracted either manually or automatically with a power source.

13. The system according to claim 1, wherein the one or more storage compartments provided in the security door are customized to increase or decrease a volume or a capacity for accommodating one or more packages of different sizes and weights.

14. The system according to claim 1, wherein the system comprises an expandable platform for connecting one or more Internet of Things (IOT) IOT devices, and wherein the one or more external IOT devices comprises camera, one or more sensors, communication modules.

15. The system according to claim 1, wherein the one or more storage compartments further comprise hot and cold boxes for storing hot or refrigerated products respectively.

16. The system according to claim 1, further comprises a mobile application installing on a smartphone of the user, and wherein the mobile application is configured for enabling the user to remotely track the package delivery or pick-up activity, for viewing captured information from one or more IOT devices, for administration activity like adding/removing user and for exchanging secure electronic keys with the control unit.

17. The system according to claim 16, wherein the mobile application provided to the user is configured for allowing the user to lock or unlock the secure door or the individual compartments wirelessly from a remote location.

18. The system according to claim 1, further comprises secure electronic keys to be shared with other users for a predetermined duration for accessing the building through the secure door and for usage of the one or more storage compartments.

\* \* \* \* \*